(No Model.) 2 Sheets—Sheet 1.

J. A. ENOS.
CARBURETOR.

No. 486,442. Patented Nov. 22, 1892.

Witnesses.
A. Ruppert
W. T. McCarty

Inventor.
John A. Enos,
Per
Thomas P. Simpson
Atty (No Model.) 2 Sheets—Sheet 2.

J. A. ENOS.
CARBURETOR.

No. 486,442. Patented Nov. 22, 1892.

Witnesses.
A. Ruppert

Inventor.
John A. Enos
Per
Thomas P. Simpson
Atty.

UNITED STATES PATENT OFFICE.

JOHN A. ENOS, OF BOSTON, MASSACHUSETTS, ASSIGNOR OF ONE-HALF TO DANIEL J. BYRNES, OF WASHINGTON, DISTRICT OF COLUMBIA.

CARBURETOR.

SPECIFICATION forming part of Letters Patent No. 486,442, dated November 22, 1892.

Application filed February 13, 1892. Serial No. 421,468. (No model.)

*To all whom it may concern:*

Be it known that I, JOHN A. ENOS, a citizen of the United States, residing at Boston, in the county of Suffolk and State of Massachusetts, have invented certain new and useful Improvements in Gas Regulators and Carburetors; and I do hereby declare the following to be a full, clear, and exact description of the invention, such as will enable others skilled in the art to which it appertains to make and use the same.

The special object of the invention is to purify and carburet ordinary illuminating-gas before it reaches the burner-pipes, the same being an improvement upon my patent, No. 139,131, granted by the United States of America on the 20th day of May, 1873.

Figure 1:
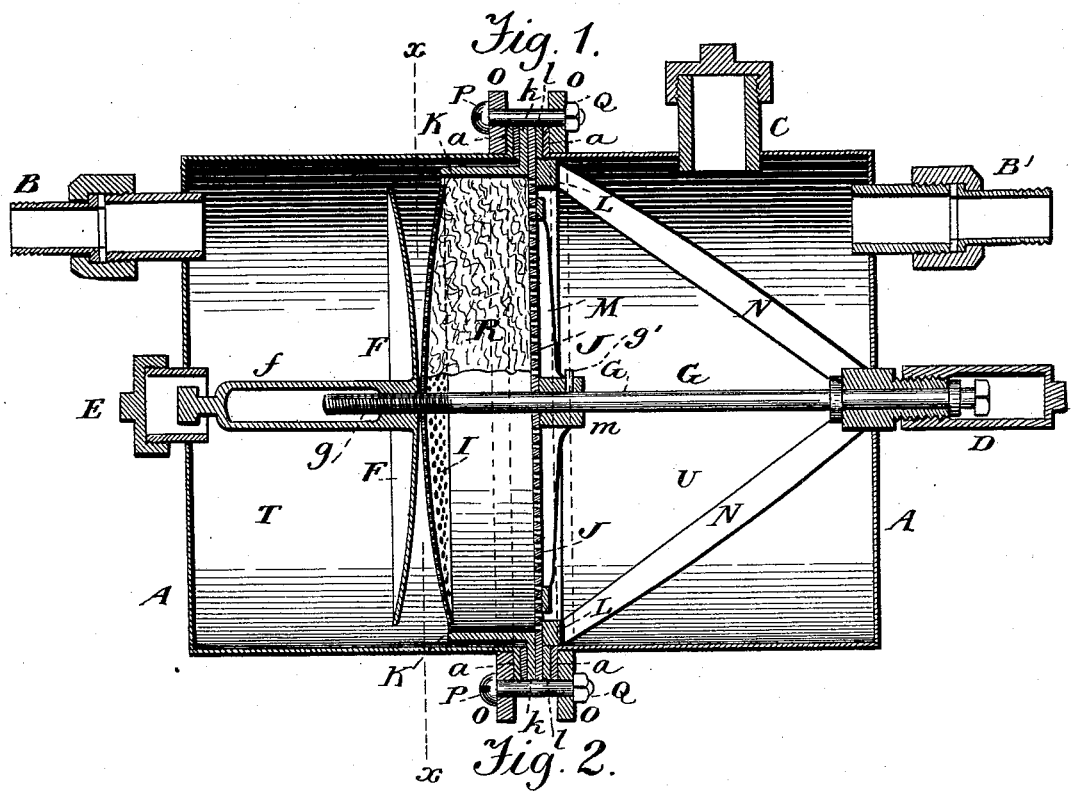
Figure 2:
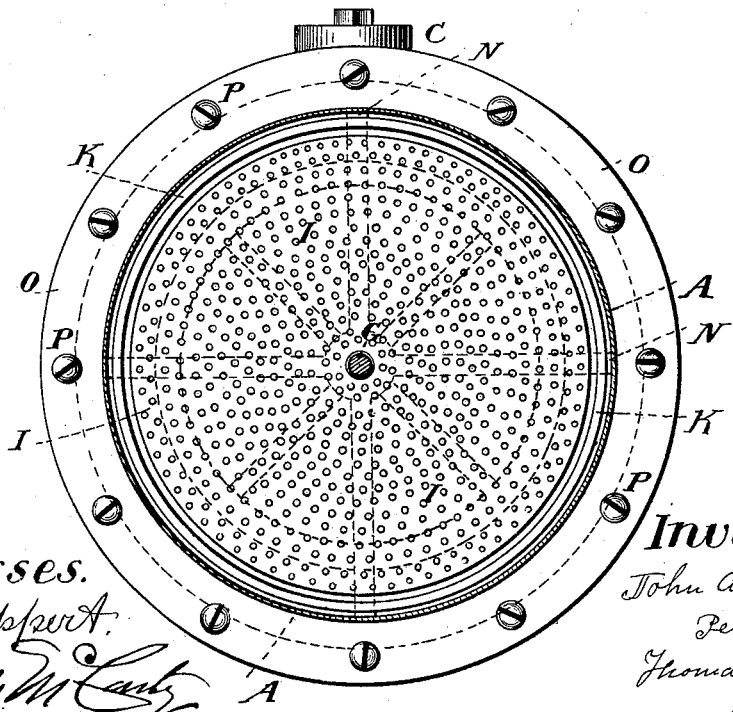
Figure 3:
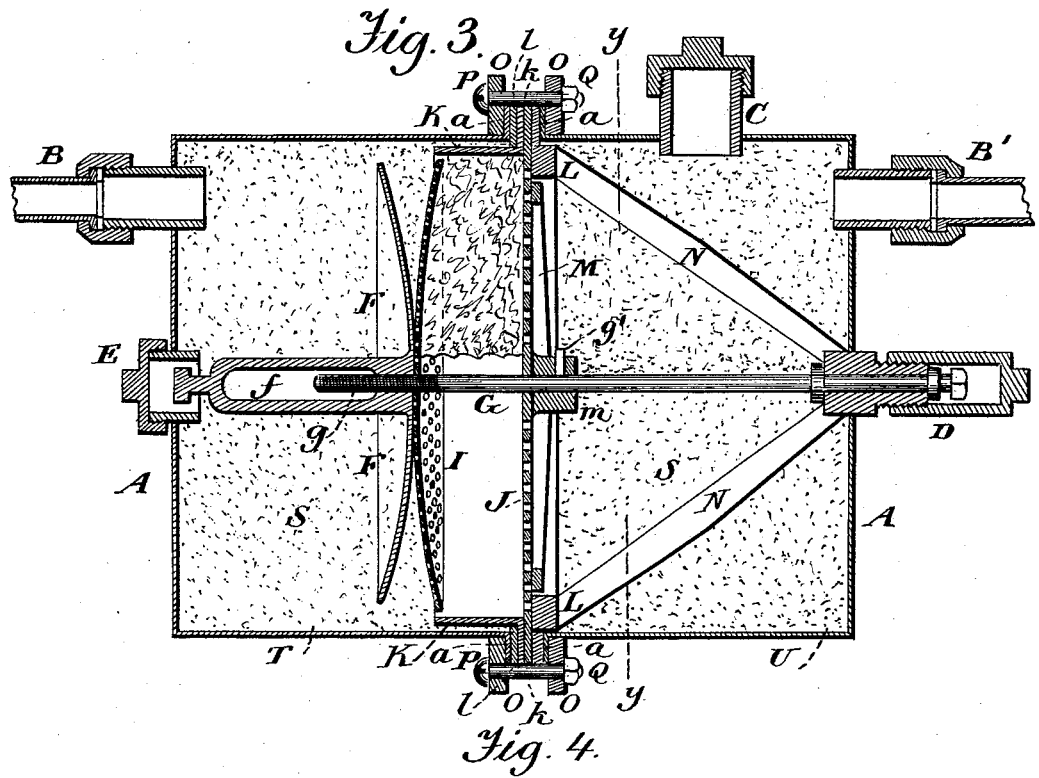
Figure 4:
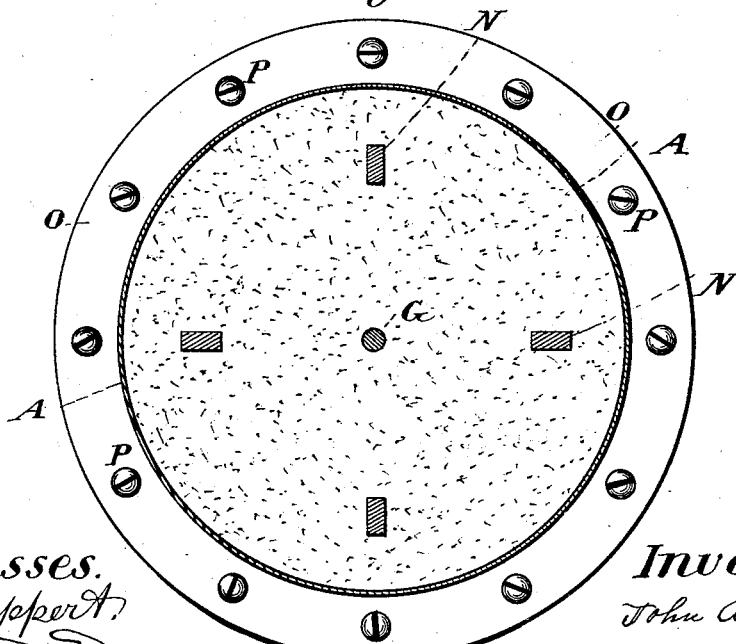

Figure 1 of the drawings is a longitudinal vertical section of my apparatus; Fig. 2, a vertical cross-section on the dotted line *x x* of Fig. 1; Fig. 3, a longitudinal vertical section showing the asbestus absorbent, and Fig. 4 a vertical cross-section on the dotted line *y y* of Fig. 3.

In the drawings, A represents the case divided into two equal and similar sections with the corresponding flanges *a a*. In this case I solder the inlet and outlet pipes B B' for the gas, the inlet C for the liquid hydrocarbon, the centrally and externally threaded tube D, and the central screw-capped tube E, the latter being simply a "way" for the extension of the nut *f*, which carries at its inner end the concavo-convex disk F. G is a bolt, whose threaded end *g* works in the nut *f*.

I is a concavo-convex diaphragm, which is flexible and convexed toward the convexity of the disk F, the two parts F G being both arranged centrally on the screw-bolt.

J is a plain perforated disk secured between a tube K, flanged at *k*, and the ring L, arranged between the packings *l l*. This disk is reinforced by the spider-brace M, whose hub *m* is fast to the screw-bolt G and held by a set-screw *g'*, while the ring L is supported by the braces N, extending from the tube D. The case-flanges *a*, tube-flange *k*, ring-flange *l*, and disk J are all clamped together between the external rings *o o* by the bolts and nuts P Q.

R is an elastic packing, of sponge or other elastic substance, packed in the chamber formed by the perforated disk J, diaphragm I, and tube K. This packing must be elastic, so as to resume its bulk when pressure is withdrawn.

S is a packing made of finely-divided asbestus, which is lightly packed in the chambers T U and not subjected to pressure. The packings S R S are all saturated with hydrocarbon passed into the case through the inlet C and the unabsorbed remainder then removed.

The joints of my apparatus are soldered, so as to come apart in time of fire, and the gasoline is all in the absorbents, so that no explosion will then occur, but the gasoline be gradually used up as it feeds the flame.

The method or process through which the gas passes is as follows: The gas under pressure in the pipes and after passing through the meter is first passed through finely-divided asbestus saturated with gasoline, so as to relieve it of its grosser impurities, which are afterward found in the chamber T. It is then passed through the compressed sponge, which relieves it of aqueous vapor and divides it into small particles, which, as they issue from the sponge-filter, present a maximum of surface contact with the gasoline in chamber U. From thence it passes to the burner-pipes in a highly-carbureted condition and free from all those impurities which make the light dull and of low candle-power. Indeed, the purification which the gas undergoes by my process of treatment renders it a practically non-condensible gas capable of giving a clear, steady, and strong light.

By the most careful experiments I find that my purified, recarbureted, and non-condensable gas will produce more than four times the candle-power from a given volume than the gas now furnished by gas companies. On the other hand, if the gas is passed through my apparatus before it passes through the meters the gas companies can reduce their charge per thousand cubic feet one-half and yet make as much net profit as they now do.

What I claim as new, and desire to protect by Letters Patent, is—

A gas carbureting and purifying apparatus consisting of a metallic case with the internally-threaded tube D, the screw-bolt G, the convex disk, the nut *f*, the flexible convex diaphragm I, the perforated disk J, the tube K, and the packings S R S, substantially as shown and described.

In testimony whereof I affix my signature in presence of two witnesses.

JOHN A. ENOS.

Witnesses:
   A. RUPPERT,
   JOSEPH ROY.